United States Patent [19]

Tatsuzawa

[11] Patent Number: 4,715,230

[45] Date of Patent: Dec. 29, 1987

[54] PRESSURE REDUCING INSTRUMENT FOR PRESSURE GAUGES

[75] Inventor: Hisao Tatsuzawa, Odawara, Japan

[73] Assignee: Yamaya Sangyo Co., Ltd., Kanagawa, Japan

[21] Appl. No.: 769,243

[22] Filed: Aug. 26, 1985

[30] Foreign Application Priority Data

May 13, 1985 [JP] Japan .............................. 60-070268[U]

[51] Int. Cl.⁴ ................................................. G01L 7/16
[52] U.S. Cl. ........................................... 73/706; 73/744
[58] Field of Search ................... 73/744, 745, 746, 706

[56] References Cited

U.S. PATENT DOCUMENTS

| | | | |
|---|---|---|---|
| 3,521,491 | 7/1970 | Limbach | 73/706 |
| 3,760,638 | 9/1973 | Lawson et al. | 73/706 |
| 4,193,307 | 3/1980 | Baker et al. | 73/744 |

*Primary Examiner*—Donald O. Woodiel
*Attorney, Agent, or Firm*—Steele, Gould & Fried

[57] ABSTRACT

The present invention relates to a pressure reducing instrument for pressure gauges and includes a cylinder and a piston operable within the cylinder. The piston is designed with a pressure receiving face and a pressurizing face, and includes a plunger fixed on an end portion of a piston. An intermediate member having an atmospheric introductory aperture which penetrates through the plunger and leads to the piston is secured to the cylinder, the introductory aperture being open in an end face portion of the plunger. The instrument further includes a pressure transmitting fluid-retaining portion maintaining the pressure transmitting fluid, a detecting rod penetrated through by an introductory aperture and being received in the pressure transmitting fluid-retaining portion and a clamp member being tightened to the cylinder by a bolt through a rod seal. An end of the detecting rod is capable of connecting with the pressure introductory portion of the pressure gauge, and the introductory aperture for the pressure liquid to be measured in the member becomes to be able to connect with the source of the pressure to be measured by a joint. Furthermore, an area pressed by the piston at the pressure transmitting liquid-retaining portion is enlarged more than an area of the end face of the plunger.

1 Claim, 1 Drawing Figure

PRESSURE REDUCING INSTRUMENT FOR PRESSURE GAUGES

BACKGROUND OF THE INVENTION

1. Field of the Invention

The present invention relates to pressure reducers, and more particularly to a pressure reducing instrument for pressure gauges which is used in pressure measurement of high pressure liquids.

2. Description of the Prior Art

Generally, when measuring pressures, the pressurized liquid to be measured is introduced directly within a suitable pressure gauge and then the pressure is measured by an indicator of the pressure gauge. A usual type of pressure gauge (for example, J I S B 7505 Bourdon tube-pressure gauge) has been employed in the pressure range 0–1,000 kg/cm$^2$, special high-pressure gauges for the pressure measurement of super-high pressure liquids of more than 1,000 kg/cm$^2$ have been required for such high pressure measurements.

When the pressure measurement of the super-high pressure liquid (1,000–5,000 kg/cm$^2$) is performed and a high-pressure gauge is used but it is known that such high-pressure gauges are very expensive in comparison with the ordinary type-pressure gauge. Also, the installation and treatment of said high-pressure gauges are difficult and sometimes dangerous, and the adjustment and repairs for said high-pressure gauges are not easy.

Further, in the case of liquids accompanied with pulsation, for example, a liquid which is emitted from a plunger pump and the like is necessarily accompanied by the pulsation, the pulsation causes a vibration of the indicator of the pressure gauge. It has been experienced that such vibration could be as much as ° 25% of the producing pressure when the vibration is frequent. Also, it is known that this vibration could cause an error in the measured pressure and undoubtedly could result in accidental damage to the pressure gauge.

SUMMARY OF THE INVENTION

It is an object of the present invention to provide a pressure reducing instrument for pressure gauges that reduces the pressure of the pressure liquid to be measured. It is another object to provide a pressure reducing instrument for pressure gauges that is capable of averaging pulsation. It is another object of the invention to provide a pressure reducing instrument for pressure gauges and enables the pressure measurement of the high-pressure liquid to be performed very accurately and easily by means of an ordinary low pressure type pressure gauge with complete safety.

The present invention is characterized in including an inside piston as the means for solving the aforesaid problems. The said piston is designed with a pressure face for receiving the fluid under pressure to be measured and a pressurizing face in contact with a pressure transmitting fluid, the pressurizing face having an enlarged area in contact with the said pressure transmitting fluid. The pressurizing face of the piston is greater in area of pressure face of the said piston thereby enabling the pressure transmitting fluid to connect directly to a pressure introductory portion of the pressure gauge at a reduced pressure.

DESCRIPTION OF THE PREFERRED EMBODIMENT OF THE INVENTION

Figure 1:
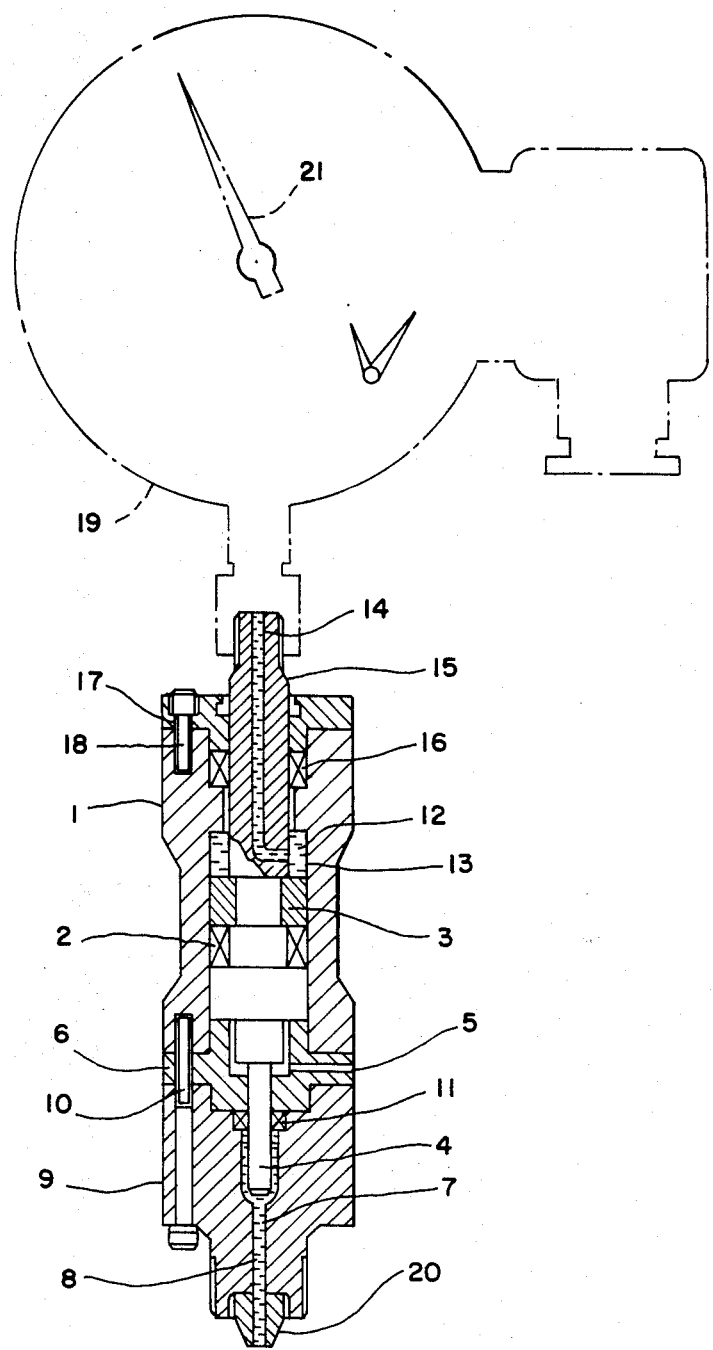
FIG. 1 is a vertical section showing the preferred embodiment of the present invention. The pressure gauge is illustrated in phantom lines for purposes of association.

Referring now to the drawing, a piston 3 is reciprocal within a cylinder 1. A seal 2 is interposed between the cylinder 1 and the piston 3 to prevent leakage and fluid therebetween. The piston 3 is divided and fixed to the plunger 4 and the plunger 4 is fixed on the bottom end of an reciprocates in unison with the piston. An intermediate member 6 within which an atmospheric introductory way 5 is secured to the cylinder. The said atmospheric introductory way 5 penetrates through the member 6 and leads to the piston 3 and the plunger 4. A bottom projection of the plunger 4 is received in introductory aperture 8. A bottom member 9 which includes the introductory aperture 8 of the pressure liquid 7 to be measured is securely affixed to the cylinder 1 together with the intermediate member 6 one or more bolts 10. The pressurized fluid introductory aperture terminates upwardly at the plunger seal 11 in a manner to expose an end face portion of the plunger 4 to the pressurized fluid pressure forces.

Further, a pressure transmitting fluid-retaining portion 13 for maintaining a pressure transmitting fluid 12 is formed within the cylinder 1 above the upper end of the piston 3. A detecting rod 15 within which an introductory aperture 14 is formed to communicate with said pressure transmitting fluid-retaining portion 13 is a portion of the piston 3 and is received in the said cylinder 1. A further clamp member 17 is tightened to the cylinder 1 by employing one or more bolts 18 through a rod seal 16 to secure the detecting rod 15 to the cylinder. An upper end of said detecting rod 15 is designed to be capable of connecting with the usual pressure introductory portion of the pressure gauge 19.

The introductory aperture 8 for the pressure liquid 7 to be measured in the member 9 connects with the source of the pressure liquid to be measured (not shown) by a joint 20. It should be noted that the area pressed by the piston 3 at the pressure transmitting liquid-retaining portion 13 (the area to be pressed by the pressure transmitting fluid 12) is greatly enlarged over the area of the end face of the plunger 4 (the pressure receiving area of the pressure liquid to be measured in the piston 3.).

Further, for use as the pressure transmitting fluid 12, it is preferable to utilize various liquids and it is especially preferable to use grease.

In the drawing, the numeral 21 indicates the indicator of the pressure gauge 19.

Referring now to the operation of the device, when the member 9 is connected with the source of the pressure liquid to be measured through the joint 20 and the detecting rod 15 is connected with the pressure gauge 19, the pressure liquid 7 to be measured flows through the joint 20 and through the introductory aperture 8. In this manner, the end face of the plunger 4 which is fixed on the piston 3 receives the pressure. The pressure received by the end face of the plunger 4 forces the plunger 4 and the plunger connected piston 3 upwardly. At the same time, the detecting rod 15 and the pressure gauge 19 are moved with the piston, but these movements are slight. This movement presses the pressure transmitting fluid 12 which is maintained within the pressure transmitting fluid-retaining portion 13 by the piston 3. This pressure is uniformly transmitted through the aperture 14 into the pressure gauge 19 to cause movement of the indicator 21.

Now then, provided that the area to be pressed by the piston 3 for the pressure transmitting fluid 12 is regarded as $A_1$, the pressure receiving area (an end area of the plunger 4) of the pressure liquid 7 to be measured in the piston 3 is regarded as $A_2$, the pressure per unit area of the pressure transmitting fluid 12 is regarded as $P_1$ and the pressure per unit area of the pressure liquid 7 to be measured is regarded as $P_2$, the following related formulas are obtained.

$$P_1 A_1 = P_2 A_2 \quad (1)$$

$$P_1 = A_2/A_1 P_2 \quad (2)$$

Since there is the relationship $A_1 > A_2$, the pressure of $P_1$ is reduced by $A_2/A_1$ times $P_2$.

If, for example, when $A_1 = 10 A_2$, the pressure of $P_1$ is reduced to one-tenth of $P_2$, and when the pressure of the liquid to be measured ($P_2$) is 3,500 kg/cm$^2$, the pressure of $P_1$ is reduced by the pressure reducing instrument to 350 KG/cm$^2$. This considerable pressure reduction enables the use of an ordinary type-pressure gauge and additionally, the measuring accuracy becomes ten times greater.

Further, even if the pressure liquid 7 to be measured pulsates, the pulsation will be transmitted as the mean pressure by the piston 3 to the presure transmitting fluid 12 and then the pressure measurement by the gauge 19 becomes easy and the possibility of damage to the pressure gauge becomes minimized.

As mentioned above, according to the present invention, the pressure transmitted to the pressure gauge can be reduced optionally. It is possible to use an ordinary type-pressure gauge for the pressure measurement of a super-high pressure liquid without using a customary high-pressure gauge. The use of the present invention is very economical and the measuring accuracy is improved. In the event of pulsations in the pressure liquid to be measured, the pulsations will be averaged, and the possibility of damage to the pressure gauge becomes minimized. Further, even if the pressure gauge should be damaged, the high-pressure liquid will not escape to the outside, and thus very useful effects such as safety and the like in the treatment will be obtained.

What is claimed is:

1. A pressure reducing instrument for pressure gauges which comprises a cylinder;

a piston inside the cylinder, said piston having a pressure receiving face which is impinged by a pressure fluid to be measured and a pressurizing face for contacting a pressure transmitting fluid, the area of the pressurizing face being greater than the area of the pressure receiving face;

a bottom member secured to the bottom of the cylinder, the bottom member being provided with an introductory aperture, the introductory aperture beginning at one end of the exterior of the bottom member and terminating at its other end near the piston pressure receiving face whereby the pressure of the pressure fluid to be measured impinges the pressure receiving face;

an intermediate member interposed between the cylinder and the said bottom member;

the intermediate member comprising a central cavity, a portion of the piston being positioned within the central cavity.

the intermediate member being provided with an atmospheric conduit, the atmospheric conduit leading from the central cavity to the exterior periphery of the intermediate member;

the central cavity being positioned to introduce atmospheric pressure upon the piston intermediate its pressure receiving face and its pressurizing face;

whereby the said pressure transmitting fluid can be introduced into the pressure introductory portion of the pressure gauge at a pressure that is less than the pressure of the pressure fluid to be measured.

* * * * *